United States Patent
Yan et al.

(10) Patent No.: US 10,862,701 B2
(45) Date of Patent: Dec. 8, 2020

(54) METHOD FOR THE COORDINATED CONTROL OF AT LEAST TWO DEVICES

(71) Applicant: Vorwerk & Co. Interholding GmbH, Wuppertal (DE)

(72) Inventors: Wenjie Yan, Düsseldorf (DE); Martin Helmich, Duisburg (DE); Roman Ortmann, Duisburg (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 15/963,693

(22) Filed: Apr. 26, 2018

(65) Prior Publication Data

US 2018/0316519 A1    Nov. 1, 2018

(30) Foreign Application Priority Data

Apr. 27, 2017   (DE) .......................... 10 2017 109 109

(51) Int. Cl.
| | |
|---|---|
| *H04L 12/28* | (2006.01) |
| *A47J 36/34* | (2006.01) |
| *A47J 36/32* | (2006.01) |

(52) U.S. Cl.
CPC ........ *H04L 12/2838* (2013.01); *A47J 36/321* (2018.08); *H04L 12/2816* (2013.01); *H04L 2012/285* (2013.01)

(58) Field of Classification Search
CPC ............. H04L 12/2838; H04L 12/2816; H04L 2012/285; A47J 36/32
See application file for complete search history.

(56) References Cited

U.S. PATENT DOCUMENTS

| | | | |
|---|---|---|---|
| 10,181,978 B1* | 1/2019 | Argenti | H04L 67/12 |
| 2016/0162004 A1* | 6/2016 | Ljubuncic | G06F 1/3228 |
| | | | 713/320 |
| 2016/0238459 A1* | 8/2016 | Koetz | G01K 1/024 |
| 2016/0309954 A1* | 10/2016 | Lentzitzky | H04L 12/2816 |
| 2018/0034913 A1* | 2/2018 | Matthieu | H04L 67/125 |
| 2018/0062691 A1* | 3/2018 | Barnett, Jr. | H04B 1/401 |

FOREIGN PATENT DOCUMENTS

| | | |
|---|---|---|
| DE | 102011085521 A1 | 5/2013 |
| DE | 102014112115 A1 | 2/2016 |
| EP | 3056882 A1 | 8/2016 |

OTHER PUBLICATIONS

Extended European Search Report for European Application No. 18169709.5 dated Sep. 17, 2018, with an English translation, 8 pages.

* cited by examiner

*Primary Examiner* — Brian P Cox

(74) *Attorney, Agent, or Firm* — Rudy J. Ng; Bret E. Field; Bozicevic, Field & & Francis LLP

(57) ABSTRACT

The invention relates to a method (100) for the coordinated control of at least two devices (10), wherein at least a first device (10*a*), preferably a food processor (10*a*), and a second device (10*b*) are provided, which are different from one another in terms of a respective functionality.

20 Claims, 2 Drawing Sheets

Figure 4:
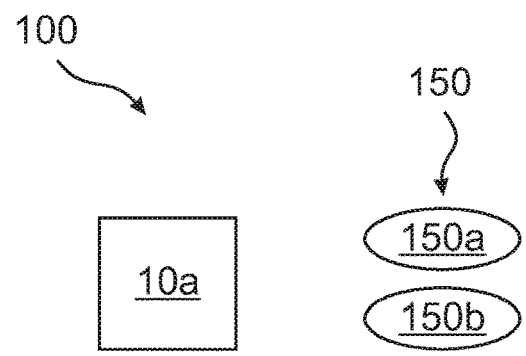

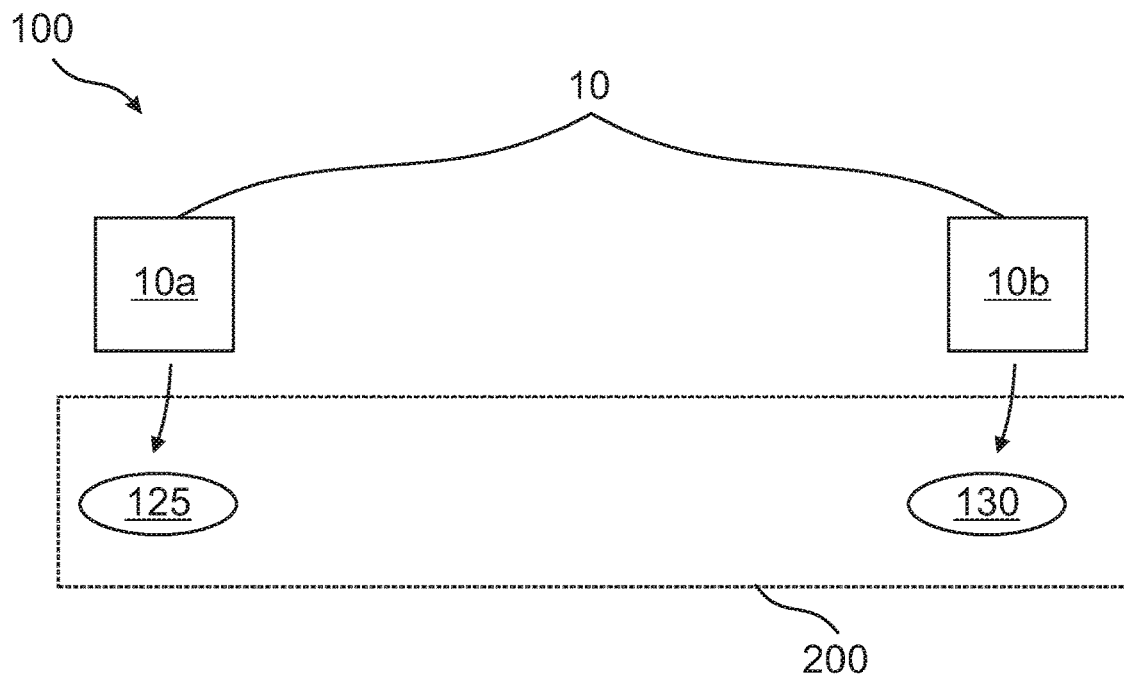
Fig. 1
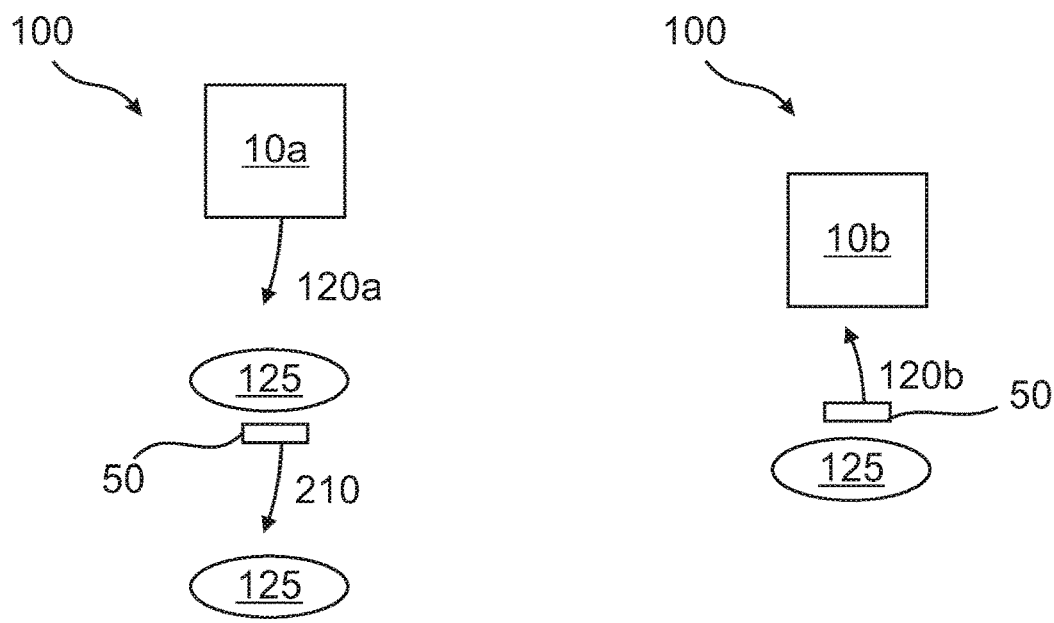
Fig. 2
Fig. 3

METHOD FOR THE COORDINATED CONTROL OF AT LEAST TWO DEVICES

The present invention relates to a method for the coordinated control of at least two devices according to the preamble of the independent method claim. Furthermore, the invention relates to a device for the coordinated control of at least two devices according to the independent device claim.

It is known from the prior art that the functionalities of various devices can be complementarily used in a manual manner. For example, various devices for the provision of functions for the preparation of food are present in a kitchen. In a preparation process according to a recipe, a user uses these different devices according to the individual steps of the recipe, so that, for example, first a roasting of the food products with a stove hob and, subsequently, a cooking in a baking oven occur.

Food processors that enable an at least partially automated preparation of food products are also known. A single food processor readily provides a variety of multiple preparation functionalities, such as, for example, a cutting and (simultaneous) heating of food products. It is already possible that these various functionalities of the individual device can be used complementarily, at least partially automatically.

However, it is often a disadvantage that the complementary use of various functionalities of various devices can occur only manually, or in a very limited automated fashion. Furthermore, communication between various devices is often possible only to a limited extent, as the devices comprise different communication interfaces. This additionally complicates automation and combination of the functionalities of the devices. Thus, another disadvantage is that, in many cases, compatibility is not ensured for a data-related communication between various devices.

Thus, it is an object of the present invention to at least partially resolve these disadvantages. In particular, it is an object of the invention to enable and/or to improve an at least partially automated complementary use of functionalities of various devices. Thus, in particular, it is an object of the present invention to improve and/or simplify the data-related communication between various devices.

The above object is achieved by a method as described herein, and by a device as described herein. Further features and details of the invention result from the respective dependent claims, the description and the drawings. Features and details described in the context of the method according to the invention likewise naturally apply in the context of the device according to the invention, and in each case vice versa, so that reference is or can, in any case, be made mutually to the disclosure of the individual aspects of the invention.

In particular, the object is achieved by a method for the coordinated control of at least two (or at least 4 or at least 10 or at least 15) devices, in particular food processors and/or household appliances, wherein at least a first device, preferably a food processor, and a second device, and/or further devices, are provided, which can differ in terms of a respective functionality. The respective functionality in particular serves to prepare (meant thereby is any type of processing, such as cutting, shelling and peeling, cooking, cooling, etc.) food products and/or to provide household functions (meant are weighing, packaging, cleaning, arranging, etc.).

Thus, the first device can be embodied as a food processor, so that the first device comprises, for example, a first functionality for mixing and/or a second functionality for cutting and/or a third functionality for heating food products. In particular, the food processor includes a heating and/or a stirrer and/or a scale and/or a computing unit for the at least partially automated preparation of food products. Preferably, the food processor includes an interface unit for connecting to a network, in particular a Local Area Network (LAN) and/or a Wireless LAN (WLAN) Network. Particularly preferably, the food processor comprises and input and/or output device, which is embodied as a touchscreen, for example. This enables a simple input of user input, and output of information, respectively.

It is conceivable here that a global level (for the communication of the devices) is provided, to which the devices can transmit at least one request information and at least one reply information, so that the (respective) functionalities of the devices can particularly be used complementary. The global level preferably includes one or multiple (digital) interfaces and/or (digital) transmission mechanisms. Preferably, the global level includes at least one data protocol for the data transport and/or the like. Preferably, the global level is provided by an electronic processing unit, in particular a computer and/or processor or the like.

In this context, the term "complementary" particularly means that a user and/or the first device besides (its own) functionality of the first device can use, in a complementary manner, the functionality of at least one further device, in particular of the second device, and/or vice versa. This is particularly advantageous in the case that a recipe processing occurs through one of the devices, so that a more complex preparation of food including multiple preparation steps (and/or function steps) is required, which can thus also take place simultaneously in order to save time. The preparation steps can e.g. include function steps such as roasting and/or cooking and/or cutting and/or baking and/or toasting and/or stirring and/or (steam)cooking and/or the like. In particular, the preparation steps and/or function steps also include parameters such as the cooking temperature and/or the cooking time. Since one single device may often not be capable of supporting all functions due to the variety of different recipes, it is necessary to use multiple devices for the complete recipe. Accordingly, the functionalities of the devices must be used complementary and often in a manner to be coordinated in time. This usually occurs manually, e.g. by a user or cook, which operates various food processors.

Preferably, the method according to the invention enables an at least partially or completely automated processing of recipes and/or a complementary use of the functionalities of different devices.

Preferably, to that end, at least one of the following steps is carried out, preferably successively or in any order, wherein preferably, individual steps can also be carried out repeatedly:

a) generating and/or providing of the at least one request information at the first device, wherein the request information is generated depending on an available functionality and/or an operation (e.g. a recipe processing) of the first device, wherein the operation includes a recipe processing and/or the functionality includes a food preparation function, for example b) transmitting the request information to the global level, in particular by the first device and/or by an interface unit, c) receiving the request information by at least the second device, which is preferably connected to the global level, in particular from further devices or every device connected to the global level (in particular except the first device), d) evaluating the request information at least at the second device and/or at the further device and/or at every device (in particular except the first device), wherein the request information is compared with the functionality available at the second device and/or the further device and/or every device (in particular by the second device or the further device), so that the reply information is generated and/or provided depending on this comparison (the request information with the available functionality), and in particular the reply information comprises information about the available functionality of the device, wherein preferably an adjustment of the operation of the first device occurs by means of the reply information.

In other words, in particular due to the transmission and evaluation of the request and reply information, a request-reply-dialog is started, which serves for negotiating and coordinating the functionalities, so that an optimum complementary (as well as time-optimized) use is enabled. The method according to the invention particularly provides the advantage that a communication for the provision of the functionalities can be provided at a high device compatibility and flexibility. Thus, it is also conceivable that some devices support the functionality determined by the request information only partially or to a limited extent or are used otherwise. In this case, for example, the first device can evaluate which of the other devices support the said functionality to a greater extent or whether the limited functionality can be compensated by other devices. Accordingly, steps a) to d) can also at least partially occur iteratively, wherein in this case a newly generated request information (according to step a)) is generated depending on the last reply information (according to step d)).

Preferably, the devices are embodied completely separately and/or spaced from one another. Thus, separate devices are concerned, which are, for example, not directly in connection one another, in particular do not comprise any direct communication connection amongst one another (i.e. merely indirectly through the global level). Preferably, every device includes an electronic, which in each case operate independently from one another. In particular, all devices are embodied in a different manner and/or separately in terms of construction.

In particular, the generation of the request information occurs based upon a recipe step, preferably when the first device can not provide the functionality required by the recipe step. For example, according to a first request information transmitted, a cooking of a food product in the baking oven for 5 minutes with simultaneous roasting is requested. It can be enabled that a further device can provide this functionality completely or only partially. According to the reply information of various devices generated thereupon, only the cooking without roasting can occur by a second device, and only the roasting without cooking can occur through a third device, for example. According to this request information, being newly generated in dependence on this reply information thereupon, cooking and roasting can, for example, be requested in each case separately, for example a cooking for 4 minutes according to a second transmitted request information, and a roasting for 1 minute according to a third transmitted request information. In particular, in response to this new request information, reply information of the devices is again transmitted, which in particular are in part positive reply information, i.e. indicate the availability of the requested functionality.

Preferably, the request information is configured as a request whether any device is capable of providing a certain functionality and/or a certain preparation step and/or a certain function step. Alternatively or additionally, the request information is independent of a particular device, so that no particular device is directly addressed. In other words, the request information is configured as a broadcast information, in particular for all devices connected to the global level. Particularly preferably, no point-to-point connection or the like is initiated by the request information, but instead, according to the method according to the invention, a request-reply-dialog is carried out through the global level without specific addressing of individual devices (i.e. as a broadcast) in any case. Preferably, every communication connection does not go beyond the sending of a request information and the replying through the reply information, so that the connection stops after receiving the reply information. According to another advantage, communication between various devices (in particular between the first and the second device) can also occur connectionless.

In particular, the request information is not transmitted directly from the first device to the second device, but first to the global level. Preferably, communication between the devices never occurs directly and/or always occurs indirectly through the global level. This provides the advantage that a high device compatibility for the communication is ensured, since the first device does not have to know the communication interfaces of each of the other devices, and/or vice versa, but in particular only the interface of the global level.

It is also advantageous if the request information according to step a) is generated in a first format at the first device, wherein the first format is specific to the first device, and wherein for the transmission according to step b), the request information is converted from the first format to a global format. In particular, the first format depends on electronics, in particular on a computing unit, of the first device. Furthermore, it can be enabled that the conversion from the first format to the global format is effected by the first device itself, or separately from the first device. In this case, the format is e.g. a data format and/or a transmission format. Preferably, the global format is a cross-device format supported by the first and/or second and/or further devices and/or by adapters and/or interface units for these devices. This provides the advantage that a communication between devices can be enabled even though these devices do not originally support the direct communication with one another.

Furthermore, in the scope of the invention, it can be provided that the request information is converted from the global format to a second format for the receipt according to step c), wherein the second format is specific to the second device, and not known to the first device. In particular, the second format of the second device differs from the first format of the first device and/or the global format. This provides the advantage that a communication is possible also between the first and second devices, if the first device does not know the communication format (i.e. the second format) of the second device.

Advantageously, it can be provided according to the invention that in each case one interface unit is provided for the first device and/or for the second device and/or for further devices, in particular as an adapter for the global level, wherein preferably the interface unit converts a first or second or further format into a global format and/or vice versa, and in particular a command syntax and/or commands of the first format differ(s) from the command syntax and/or the commands of the second format and/or further formats. For example, the commands can include information for the control of the operation of at least one of the devices, e.g. a setting for a cooking temperature and/or for a cooking time and/or the like. This provides the advantage that different functionalities of various devices can be used in a simple manner.

It can further be enabled that the devices and/or the first device and/or the second device are connected to the global level via an interface unit or a connection unit. The (e.g. electric) connection of the device (in particular the first and/or second device) to the global level, in particular via the interface unit or the connection unit, occurs e.g. via a LAN and/or WLAN and/or Bluetooth and/or NFC and/or mobile radio communication and/or radio and/or mechanical and/or electrical and/or optical and/or acoustical and/or magnetical and/or power line interface. This enables a simple and reliable transmission of information.

Furthermore, it is conceivable that the devices can each be operated independently from one another by a user through a respective user interface of the devices, wherein in particular a second device is designed as an oven or microwave or toaster or fridge or as a further food processor. It is certainly also possible that at least one of the devices is designed as another type of domestic appliance, such as a music system, an illumination, or the like. In this way, it can e.g. also be enabled that the first device controls a lighting system, e.g. in the kitchen or living room, by means of the request information. This can, for example, also occur depending on the recipe from a recipe processing of the first device. Thus, a particularly flexible and adaptive use of various devices is possible.

In the scope of the invention, another advantage can be achieved if further devices are provided, which have different functionalities, and which are connected to the global level, and wherein the request information transmitted according to step b) is received by the further devices, so that the further devices in each case perform at least one of the following steps, preferably successively or in an arbitrary order:

evaluating the request information,
comparing it with the respective available functionality,
generating a respective reply information depending on these comparisons and/or the respective functionality, and
transmitting the reply information to the global level.

In particular, the global level can be designed to be expandable by further devices. Thus, it is ensured that the functionalities can also be expanded.

Furthermore, it is conceivable that a demand on a functionality of a potential device is determined by the request information, wherein, in particular, the request information comprises information about a predetermined preparation and/or processing of a food product and/or a preparation type and/or a specific functionality of the potential device to that end. In other words, it can be enabled that the first device does not know the particular device, but merely a demand on a specific functionality independent of a particular device. The first device can then transmit the request information to the global level, in order to thereby determine the device that supports this specific function. This is enabled by an evaluation of the reply information generated thereupon.

Furthermore, it is optionally provided that the further devices and/or the second device transmit(s) a negative reply information to the global level, when the respective functionality of the further and/or second device(s) do/does not meet a demand on the functionality made by the request information. However, it can also be enabled that the negative reply information merely includes the information that the functionality is not met. Alternatively or additionally, it can also be enabled that such a (negative) reply information that comprises information about an alternative functionality is provided. In this way, for example, the demand on the functionality can be adjusted by the first device, in order to thereby reach a compromise (e.g. originally a temperature of 200° C. was requested, and the negative reply information contains the information that merely 180° C. can be provided. This can then be accepted or not accepted by the first device, for example. In the case of acceptance, a further request information that includes a request to provide 180° C. is subsequently transmitted to the global level. Accordingly, it can particularly be enabled that the first device transmits exclusively request information (in particular as a broadcast) in response to the reply information, and thereby preferably does not enter in direct communication with the second device.

In particular, the control of the at least two devices is effected in a coordinated manner, so that the operation of the devices is performed depending on an evaluation of the request information and/or reply information. For example, a complementary use of the functionalities of various devices for processing of recipes is thus possible.

Furthermore, it is optionally possible in the scope of the invention that the negative reply information comprises information about an alternative functionality, which is specific to the respective device. For example, the first device can then evaluate the alternative functionality and make a decision whether the alternative functionality is to be used. In particular, depending on this decision, a further request information can be transmitted to the global level.

It is furthermore advantageous if, in the scope of the invention, the second device and/or the further devices each also transmit a request information to the global level, so that in particular also the first device, in response to the receipt of this request information, generates a reply information and transmits the reply information to the global level. It is possible, for example, that a user decides, in particular through a user input, which device is able to transmit the request information.

In a further option, it can be provided that the communication of the devices occurs independently of the devices via the global level, so that the first device is not known to the second device and/or to further devices, and/or vice versa. In particular, it is conceivable that the communication of the individual devices occurs merely depending on the global level, so that a global format for the global level must be known from every device.

It can further be enabled that the first device evaluates a predetermined function sequence with at least two function steps, wherein at least a first function step is supported by the functionality of the first device, so that this first function step is carried out by the first device, and at least a second function step is not supported by the functionality of the first device, so that the following steps are performed by the first device for this second function step:

generating the request information depending on the second function step,
transmitting the request information to the global level (subsequently, in particular a receiving of the request information and/or a generating of the reply information and/or a transmitting of the reply information to the global level by the second device or by further devices occurs),
receiving the at least one reply information from the global level, wherein the reply information includes an information about whether the second function step is supported by the second device and/or a further device, initiating the performing of the second function step in that a further request information is generated and transmitted to the global level.

This enables a reliable and simple complementary use of the various functionalities of the devices.

Furthermore, it is conceivable that a second device receives and evaluates an, in particular further, request information, so that depending on the request information an operation of the second device, in particular for performing a second function step, is carried out, wherein preferably a function sequence or further function steps of the function sequence are not known to the second device. The receipt of further request information is naturally also conceivable for further function steps and/or function sequences, so that even elaborate and complex function sequences can be carried out by the devices in a complementary manner.

Furthermore, it is optionally provided that the request information can comprise at least one of the following commands and/or requests:

setting a predetermined oven temperature,
setting a predetermined mixer speed,
cooking a food product for a certain period (of time) at a certain temperature,
cooking a food product to a certain consistency, wherein particularly the request information is parameterized depending on a function sequence, in particular of a recipe. Preferably, it is also conceivable that the request information does not include the specific parameter for achieving a result (e.g. a cooking time), but instead includes information about the result (e.g. a certain consistency of the food product). This enables that it is up to the device, that receives the information, how it achieves the predetermined result.

A further subject-matter of the invention is a device with at least one interface unit for performing a method according to the invention. Here, the device according to the invention provides the same advantages as have been described in detail with reference to the method according to the invention. Here, the device according to the invention is e.g. embodied as a computer having a computer program and/or as a computing unit. Preferably, the interface unit serves for the connection to the first and/or the second and/or further devices, in order to enable a communication with the global level. Preferably, the computing unit is integrated in the first and/or second and/or in the further devices. The invention is also directed to a system having the device according to the invention and the associated devices, which enable the method according to the invention.

Further advantages, features and details of the invention result from the following description, in which exemplary embodiments of the invention are individually described with reference to the drawings. Here, the features mentioned in the claims and in the description can be essential to the invention individually or in any combination. The figures show in:

FIG. 1 a schematic representation for illustrating a method according to the invention, FIGS. 2 to 6 further schematic representation for illustrating a method according to the invention.

Identical reference characters will be used for the same technical features even of different exemplary embodiments throughout the following figures.

FIG. 1 schematically represents a method 100 according to the invention. The method 100 according to the invention serves for the coordinated control of at least two devices 10 here, wherein at least a first device 10*a*, preferably in the form of a food processor 10*a*, and a second device 10*b*, are provided. These are in particular embodied as to be dimensionally spaced from one another and/or completely separated from one another.

Furthermore, a global level 200 is provided, to which the devices 10 can transmit at least one request information 125 an at least one reply information 130. This enables that the functionalities of the devices 10 can be used complementary.

According to FIG. 2, it is shown that the request information 125 can be generated at the first device 10*a* in a first format 120*a*, and subsequently is converted from the first format 120*a* to a global format 210 for the transmission to the global level 200. This conversion and/or the connection to the global level 200 can, in particular, occur by an interface unit 50.

Subsequently, it can be enabled that the second device 10*b* or further devices 10 receive the request information 125 in that a further interface unit 50 of the respective devices 10 converts the request information 125 (from the global format 210) to a second format 120*b* (for the second device 10*b*) or to further formats for the further devices 10.

FIG. 4 shows that the first device 10 can evaluate a predetermined function sequence having at least two function steps 150, wherein at least a first function step 150*a* is supported by the functionality of the first device 10*a*, and at least a second function step 150*b* is not supported by the functionality of the first device 10*a*. In this case, the first device 10*a* generates a request information 125 depending on the second function step 150*b*.

Figure 5:
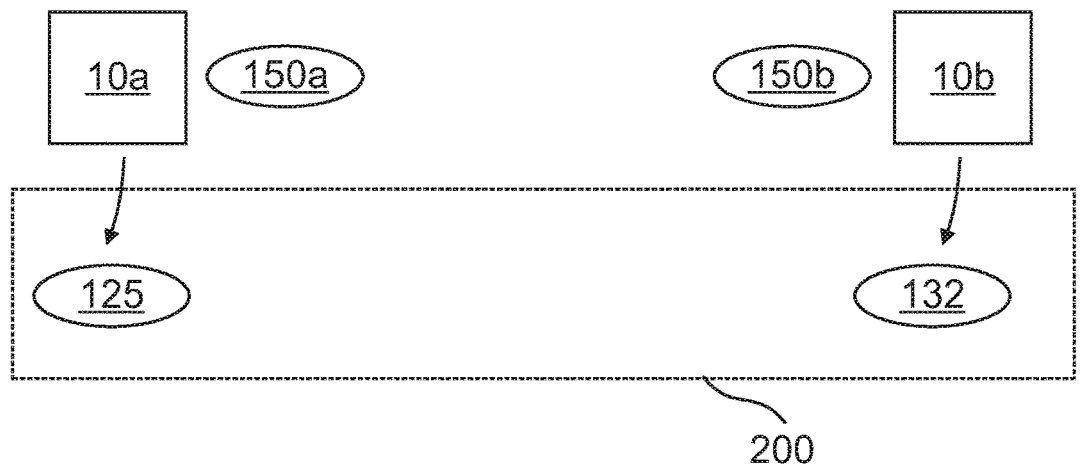

According to FIG. 5, it is indicated that the second function step 150*b* is supported by the functionality of the second device 10*b*. In this case, the second device 10*b* transmits a positive reply information 132 to the global level 200 in response to the request information 125.

Figure 6:
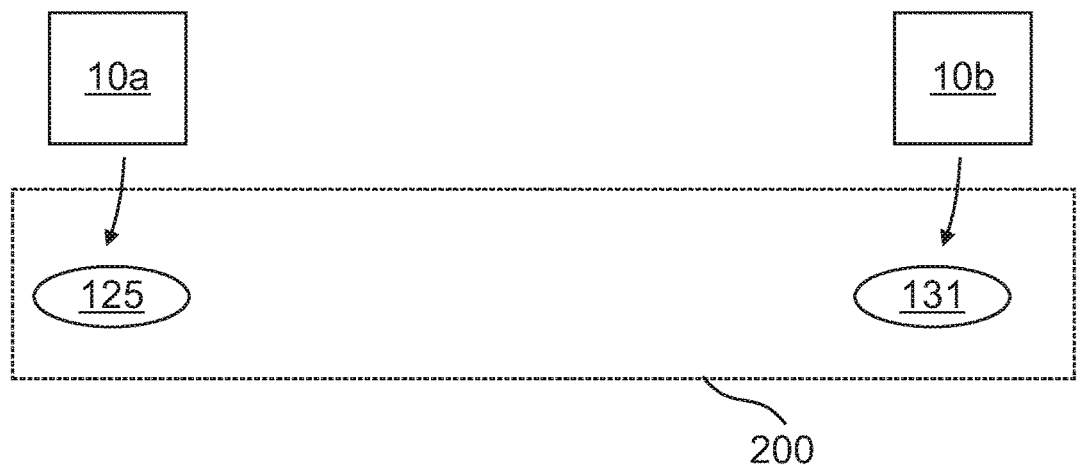

In contrast, FIG. 6 shows that the second function step 150*b* is not supported by the second device 10*b*. In this case, the second device 10*b* transmits a negative reply information 131 to the global level 200 in response to the request information 125.

The above description of embodiments describes the present invention exclusively by way of examples. Individual features of the embodiments can naturally, if technically reasonable, be freely combined with one another without departing from the scope of the present invention.

LIST OF REFERENCE CHARACTERS

10 Device
10*a* First device, food processor
10*b* Second device
50 Interface unit
100 Method
120*a* First format
120*b* Second format
125 Request information
130 Reply information
131 Negative reply information
132 Positive reply information
150 Function steps
150*a* First function steps
150*b* Second function steps
200 Global level
210 Global format

The invention claimed is:

1. A method for the coordinated control of at least two devices, wherein at least a first device comprising a kitchen appliance, and a second device are provided, which are different in terms of a respective functionality, wherein a global level is provided, to which the devices transmit at least one request information and at least one reply information, so that the functionalities of the devices are used complementarily, wherein at least the following steps are carried out to that end:

a) generating the request information at the first device, wherein the request information is generated depending on an available functionality and an operation of the first device, b) transmitting the request information to the global level, c) receiving the request information by at least the second device, and d) evaluating the request information at least at the second device, wherein the request information is compared with the functionality available at the second device, so that the reply information is generated depending on this comparison, wherein an adjustment of the operation of the first device occurs depending on the reply information, wherein further devices are provided, which comprise different functionalities, and which are connected to the global level, and wherein the request information transmitted according to step b) is received by the further devices, so that the further devices each:

evaluate the request information;

compare the request information with the respective available functionality;

generate a respective reply information at least depending on these comparisons or the respective functionality; and transmit the reply information to the global level, wherein a demand on a functionality of a device is determined by the request information, wherein the request information at least comprises at least one of the following commands or requests:

setting a certain oven temperature;

setting a certain mixer speed;

cooking a food product for a certain period of time at a certain temperature; and cooking a food product to a certain consistency, and wherein the request information is parametrized depending on a function sequence in the form of a recipe.

2. The method according to claim 1,
wherein
the request information, according to step a), is generated at the first device in a first format, wherein the first format is specific to the first device, and wherein the request information is converted from the first format into a global format for the transmission according to step b).

3. The method according to claim 2, wherein the global format is a cross-device format supported by the first, the second and the further devices.

4. The method according to claim 1,
wherein
the request information is converted from a global format into a second format for the reception according to step c), wherein the second format is specific to the second device and unknown to the first device.

5. The method according to claim 1,
wherein
in each case one interface unit is provided at least for the first device or for the second device or for further devices, wherein the interface unit at least converts a first or second or further format into a global format or vice versa.

6. The method according to claim 5,
wherein
at least a command syntax or commands of the first format differ(s) from at least the command syntax or the commands of the second format or further formats.

7. The method according to claim 1,
wherein
the devices are operated by an operator through a respective user interface of the devices, in each case independently from one another.

8. The method according to claim 7,
wherein
a second device is embodied as oven or microwave oven or toaster or refrigerator or as a further food processor.

9. The method according to claim 1,
wherein
at least a further device or the second device transmits a negative reply information to the global level, when the respective functionality of at least the further or second device does not meet a demand on the functionality that is made by the request information.

10. The method according to claim 1,
wherein
the negative reply information comprises information about an alternative functionality, which is specific to the respective device.

11. The method according to claim 1,
wherein
at least the second device or a further device in each case also transmits a request information to the global level.

12. The method according to claim 11,
wherein
also the first device generates a reply information and transmits it to the global level in response to the receipt of this request information.

13. The method according to claim 1,
wherein
the communication of the devices via the global level occurs independently of the device, so that the first device is unknown to at least the second device or to a further device or vice versa.

14. The method according to claim 1,
wherein
the first device evaluates a predetermined function sequence having at least two function steps, wherein at least a first function step is supported by the functionality of the first device, so that this first function step is performed by the first device, and at least a second function step is not supported by the functionality of the first device, so that the following steps are carried out by the first device for this second function step:

generating the request information depending on the second function step, transmitting the request information to the global level, receiving the at least one reply information from the global level, wherein the reply information includes information about whether the second function step is supported at least by the second device or a further device, and initiating the performing of the second function step in that a further request information is generated and transmitted to the global level.

15. The method according to claim 1, wherein a second device receives and evaluates a request information, so that depending on the request information an operation of the second device is performed, wherein preferably a function sequence or further function steps of the function sequence are unknown to the second device.

16. A device having at least one interface unit for performing a method according to claim 1.

17. The method according to claim 1, wherein to that end the request information comprises information at least about a predetermined preparation or processing of a food product or a preparation type or a specific functionality of the potential device.

18. The method according to claim 1, wherein the global level includes one or multiple digital interfaces or digital transmission mechanisms, the global level includes at least one data protocol for the data transport, and the global level is provided by an electronic processing unit.

19. The method according to claim 1, wherein communication of the devices via the global level occurs device-independently, so that the first device is unknown to the second device and to further devices, and vice versa, and the request information is configured as a broadcast information for all devices connected to the global level.

20. The method according to claim 1, wherein the recipe is for the kitchen appliance and wherein the recipe is for cooking.

* * * * *